United States Patent

Rosano, Jr. et al.

[15] 3,662,600
[45] May 16, 1972

[54] FLUID METER

[72] Inventors: Joseph George Rosano, Jr., Roselle Park, N.J.; J. D. Coffman, Fort Worth, Tex.

[73] Assignee: Gamon-Calmet Industries, Inc., Newark, N.J.

[22] Filed: Nov. 5, 1969

[21] Appl. No.: 874,123

[52] U.S. Cl. ............................................................. 73/257
[51] Int. Cl. .......................................................... G01f 3/08
[58] Field of Search ..................... 73/241–245, 252–258, 73/277, 233

[56] References Cited

UNITED STATES PATENTS

| | | | |
|---|---|---|---|
| 3,518,880 | 7/1970 | Kullmann et al. | 73/229 |
| 2,053,942 | 9/1936 | Bradley | 73/257 |
| 2,399,856 | 5/1946 | Coger | 73/257 |
| 2,410,852 | 11/1946 | Whittaker | 73/277 |
| 3,160,008 | 12/1964 | Gestler | 73/252 X |
| 3,440,879 | 4/1969 | Frayssinoux | 73/277 |
| 3,413,851 | 12/1968 | Curtiss et al. | 73/258 |
| 3,442,126 | 5/1969 | Southall | 73/258 |

Primary Examiner—Richard C. Queisser
Assistant Examiner—Marvin Smollar
Attorney—Lerner, David & Littenberg

[57] ABSTRACT

A fluid meter is disclosed which comprises a casing having first and second ports for fluid flow therethrough; a measuring chamber located within the casing, with the measuring chamber having upper and lower surfaces within which are situated entry and exit openings which communicate with the respective ports of the casing to thereby establish a vertical flow path through the measuring chamber; driven means preferably in the form of an oscillating piston located in the measuring chamber; motion transmitting means responsive to the driven means for transmitting the motion thereof to a location outside of the measuring chamber but within the casing; register means positioned outside of the casing for providing an indication of fluid flow; and magnetic coupling means responsive to the motion of the motion transmitting means for driving the register. Additionally, a removable screw-in bottom plate is provided to retain the measuring chamber within the casing and to selectively cover the bottom opening of the casing through which the measuring chamber is inserted during assembly.

8 Claims, 3 Drawing Figures

INVENTORS:
JOSEPH G. ROSANO, JR.
J.D. COFFMAN

BY Lerner David &
Littenberg

ATTORNEY

FLUID METER

BACKGROUND OF THE INVENTION

This invention relates to water meters and more particularly to improved water meters which are small, light, of a minimum number of parts, easy to manufacture, and subsequently relatively inexpensive to manufacture.

In the field of water meters, a number of problems have continually plagued engineers and seriously hampered their efforts to produce a water meter having all of the above described characteristics. Specifically in the design of measuring chambers, it has been the prevailing practice to locate the entry and exit openings thereof in the upstanding cylindrical side wall thereof. In addition to creating a manufacturing problem, such location of the inlet and outlet openings of the measuring chambers requires a preferred orientation of the measuring chamber when it is inserted into the meter casing in order to properly align such openings with the entry and exit ports of the meter casing respectively. To guarantee the proper alignment during the assembly operation, requires either highly skilled personnel or some additional relatively expensive key way or interlock mechanism.

A second problem prevalent in prior art water meters relates to the time consuming, complex procedures employed for inserting and retaining the measuring chamber in the meter casing and for sealing the casing once the measuring chamber has been inserted therein. The most typical prior art solution to this problem is to manufacture the meter casing as two separate members (usually castings); and then, after insertion of the measuring chamber, to secure the two castings together by some burdensome fastening technique usually employing a circumferential ring of bolts. The requirement for two individual castings to define the single casing, and the complex procedure for securing them together after insertion of the measuring chamber is an extremely expensive proposition.

A third problem inherent in most water meters of the type over which the instant invention is intended to be an improvement, relates to the register required to provide the desired indication of water flow, and more particularly to the manner in which such register is operatively connected to the internal mechanism of the meter. In many prevalent designs, a shaft is connected at one end to the driven mechanism in the measuring chamber (such as an oscillating piston or a nutating disc); then passed with the aid of stuffing box through the meter casing; and the other end of the shaft is connected to the internal driving mechanism of the register positioned on the meter casing. This technique, however, requires skilled personnel to properly interconnect the register mechanism with the mechanism protruding from the meter casing, thereby adding significantly to the overall assembly time and manufacturing cost incident thereto, and also allows leakage through the stuffing box as the packing wears.

Various ones of the above described problems, and indeed other problems, appear in various ones of the most prevalent prior art water meters in use today. It should be noted that at various stages in the development of water meters, various solutions have been proposed for the above noted problems. However, until the instant invention, the solutions proposed were never sufficiently simple nor sufficiently economical to justify adoption.

SUMMARY OF THE INVENTION

In contradistinction to the prior art, the instant invention provides a water meter having excellent performance with the added advantages of being smaller in size, lighter in weight, of minimum number of parts and therefore easy to assemble, and consequently more economical to manufacture than the multitude of individual meters and meter lines over which the instant invention is intended to represent a significant improvement.

As will be described in greater detail, the water meter of the instant invention comprises a one-piece casing within which is bottom loaded a measuring chamber of two-piece molded plastic snap-fit construction. In accordance with one aspect of the invention, the entry and exit openings to the measuring chamber are provided in the upper and lower surfaces thereof to define a vertical flow path therethrough. Thus the measuring chamber may be inserted into the meter casing in any desired orientation since there is no requirement for any side ports thereof to align with the entry and discharge ports of the meter casing.

As an additional feature of the instant invention, there is provided a removable screw-in bottom plate which performs the dual function of sealingly retaining the measuring chamber within the casing and sealingly closing of the bottom opening of the casing once the measuring chamber has been loaded therethrough.

As a particularly advantageous feature of the instant invention, the aforementioned screw-in bottom plate is provided with a plurality of upstanding spaced apart projections which perform the aforementioned measuring chamber retaining function by applying compressive forces to the measuring chamber along the upstanding circumferential wall thereof. In this manner, no compressive forces are applied to the central non-supported portion of the measuring chamber and the possibility of "locking" the driven member thereof is positively avoided.

As a further feature of the instant invention, the register used to indicate water flow is removably supported on the upper surface of the meter casing, and a magnetic coupling is utilized to operatively interconnect the internal mechanism of the meter with the internal mechanism of the register.

Accordingly, it is an object of the instant invention to provide a fluid meter which is small, simple, light-weight, compact, of minimum number of parts, easy to manufacture, easy to install, and consequently less expensive than the various prior art meters over which the invention is an improvement.

Another object of the instant invention is to provide such a fluid meter which includes a casing within which is located a measuring chamber having a vertical flow path therethrough.

Yet another object of the instant invention is to provide such a fluid meter which includes a one-piece casing having a bottom opening through which the measuring chamber thereof is insertable, and a removable screw-in bottom plate which performs the dual function of sealingly retaining the measuring chamber in the casing and covering the bottom opening thereof.

Yet another object of the instant invention is to provide such a fluid meter which includes magnetic coupling means for operatively interconnecting the meter mechanism with the internal mechanism of a register positioned thereabove.

Yet another object of the instant invention is to provide such a fluid meter in which the measuring chamber thereof is defined by the snap-fit interconnection of thermoplastic members.

Another object of the instant invention is to provide an oscillating piston type water meter in which the oscillating piston thereof is constructed of an elastomer or polymer material having a specific gravity approximating the specific gravity of the fluid passing through the meter whereby the piston may "float" within the measuring chamber in which it oscillates.

Other objects and a fuller understanding of the instant invention may be had by referring to the following description and drawings in which.

Figure 1:
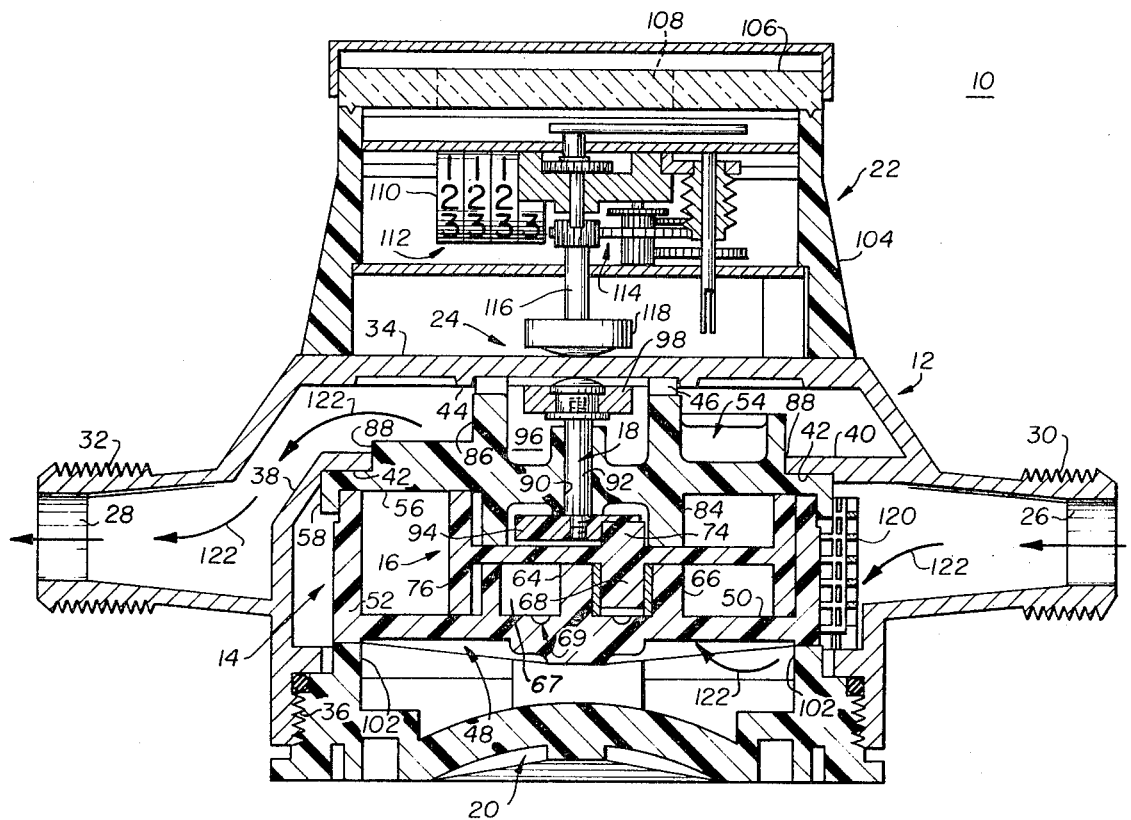
FIG. 1 is a cross-sectional plan view of a water meter constructed in accordance with the instant invention.

Turning to FIG. 1, there is illustrated the fluid meter 10 of the instant invention. By the designation "fluid" meter, it will be understood that the meter 10 has application in the measurement of flow of any fluid. However, for the remainder of the specification, the meter 10 will be referred to as a water meter since it was in the context of measuring water flow, that invention hereof evolved.

The water meter 10 includes the following main components: a casing 12; a measuring chamber 14 within which is located a water driven element 16; motioned transmitting mechanism broadly designated 18 for transmitting the motion of the driven element 16 to a point outside of the measuring chamber 14 but within the casing 12; a removable bottom plate 20 for sealingly maintaining the measuring chamber 14 within the casing 12 and for closing off the bottom opening of the casing 12; a register 22 for providing an indication of water flow through the meter 10; and coupling means broadly designated 24 for operatively connecting the register mechanism to the motion transmitting mechanism 18 without the necessity of a mechanical interconnection therebetween.

The casing 12, is preferably cast from a non-magnetically permeable material such as bronze and includes inlet and outlet ports 26 and 28 respectively which are externally threaded at 30 and 32 respectively to facilitate connection of the meter 10 into the line whose water flow is to be measured. The casing 12 further includes an upper surface 34 upon which the register 22 is removably supported; and at the bottom thereof includes an internally threaded opening 36 which receives the externally threaded cover plate 20 in a manner to be further described.

The casing 12 is further manufactured with integrally extending projecting portions 38 and 40, the extremities of which define a circularly apertured retaining surface 42 against which the measuring chamber 14 is sealingly urged when the cover 20 is screwed into the opening 36. The upper surface 34 of the casing 12 is additionally provided with a depending circular boss 44 the purpose of which is to provide a seat for a sealing gasket 46 of neoprene or similar material.

Figure 2:
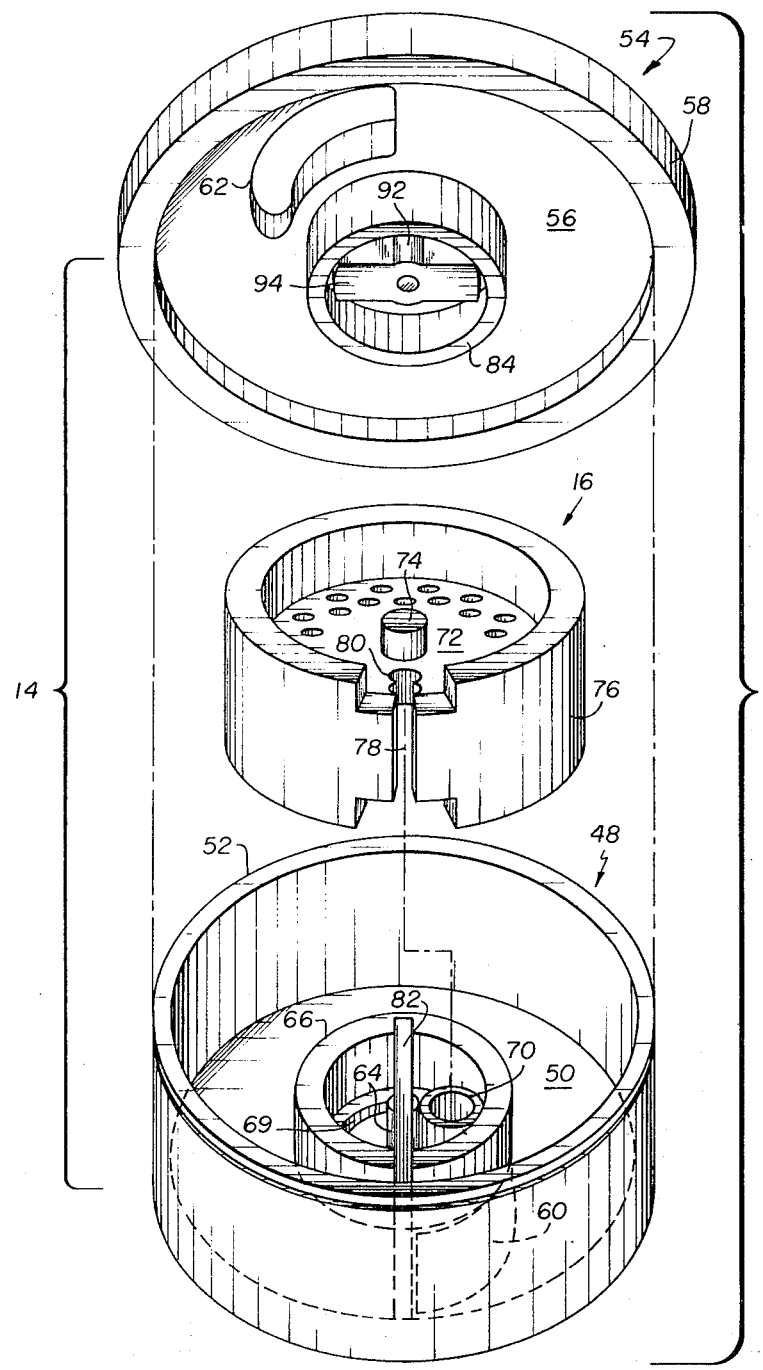
FIG. 2 is an exploded perspective view of the measuring chamber of FIG. 1 and additionally illustrating the oscillating piston thereof.

As best seen perhaps in FIG. 2, the measuring chamber 14 is preferably of two-piece construction and as such includes a lower member 48 having a lower surface 50 and an integrally upstanding cylindrical side wall 52, and an upper member 54 including an upper surface 56 thereof from which integrally depends a circumferential skirt portion 58. Preferably, both members 48 and 54 are constructed from a corrosive resistant polymer or bronze material. Additionally, the outer diameter of the upstanding wall 52 of the lower member 48 is slightly greater than the internal diameter of the depending skirt 58 of the upper member 54. Thus with the aid of the slight resiliency of the material defining the upper member 54, the upper extremity of the upstanding wall 52 can be biasingly urged or "-snap-fitted" into the projecting skirt 58 to establish a relatively unitary, watertight measuring chamber 14 without the necessity of additional fastening means.

As seen only in FIG. 2, the lower surface 50 further includes an opening 60 which represents the inlet opening to the measuring chamber 14. The outlet opening 62 of the measuring chamber 14 is provided in the upper surface 56 of the member 54. Disposed in the measuring chamber 14 is the driven element 16 which produces the desired motion representative of water flow through the measuring chamber 14 and hence through the meter casing 12.

The lower member 48 of the chamber 14 also includes an upstanding integral central projection 64 and radially disposed thereabout, an integrally upstanding cylindrical wall 66. The annular space between the projection 64 and wall 66 defines a guideway or raceway 67 within which a lower depending portion 68 of the driven element 16 may ride or be guided as the driven element 16 experiences oscillatory motion in response to water flow through the measuring chamber 14. In the preferred embodiment, the depending projection 68 of the driven element 16 actually rotates within a low friction cylindrical bearing element 70 which in turn rides in the annular space 67. In accordance with a feature of the invention, the lower surface 50 also includes a groove 69 which functions as a trap or collection means for sand and other impurities in the water flow.

As best seen in FIG. 2, the driven element 16 is, in the preferred embodiment, what is commonly known in the art as an oscillating piston. The piston 16 is preferably molded from hard, wear-resistant, elastomer or polymer of very nearly the same specific gravity as the water flowing through the meter 10. It is therefore, semi-"floating" within the chamber 14 and permits the greatest freedom of action with minimal friction. It includes a unitary member having an intermediate multi-apertured surface 72 on the lower surface of which depends the aforementioned projection 68 and from the upper surface of which extends a driving projection 74. Around the circumference of the intermediate surface 72 is provided a cylindrical wall 76 which, as best seen in FIG. 1, extends integrally above and below the intermediate surface 72. The cylindrical wall 76 includes a vertical slot 78 therethrough, which slot is co-extensive with an elongated slot 80 provided in the intermediate multi-apertured surface 72. As well known in the art, the slots 78 and 80 slidably receive the upstanding partition or bridge 82 disposed on the lower member 48 between the inner surface of the upstanding cylindrical wall 52 and the outer surface of the cylindrical wall 66, the bridge 82 being of the same height as the cylindrical wall 52.

The upper member 54 includes an integrally depending cylindrical wall 84 and an upstanding cylindrical wall surface 86 which, as best seen in FIG. 1, is urged into engagement with the gasket 46. The upper surface 56 of the upper member 54 is further provided with a recessed shoulder 88 which is received by the aforementioned circularly apertured retaining surface 42 defined in the internal portions 38 and 40 of the casing 12. Finally, the upper surface 56 includes an elongated passageway 90 through which passes a shaft portion 92 of motion transmitting means 18.

It will be appreciated that although various of the above described features of construction of the measuring chamber 14 represent significant improvements over the prior art, the basic concept of an oscillating piston type of water meter is well known in the art and forms no part of the instant invention. Consequently, a detailed description of the motion of the driven element 16 need not presented in the instant specification. It is sufficient to note, for the purpose of understanding the instant invention, that water flow through the measuring chamber 14 causes the driven element or piston 16 to experience oscillatory motion defined by the relative longitudinal movement of the driven element 16 with respect to the bridge 82 and by the rotative movement of the driven element 16 established by the location of the depending portion 68 thereof constrained for movement in the annular space 67 of the lower member 48.

Thus, as driven element 16 experiences oscillatory motion, the upstanding projection 74 on the intermediate surface 72 thereof will describe a circular path of motion within cylindrical wall 84 depending from the upper member 54 of the measuring chamber 14. It is the circular motion of the upstanding projection 74 of the driven element 16 which is employed to rotate a driver arm 94 of the aforementioned motion transmitting means 18.

The motion transmitting means 18 includes the driver arm 94 secured to one end of the aforementioned shaft 92 for rotation therewith. It will be appreciated that the combination of the driver arm 94 and the shaft 92 has the effect of transmitting the motion of the driven element 16 to a location 96 which is outside of the of the measuring chamber 14 but within the casing 12. Such location 96 actually comprises a water tight housing or cavity established by the upstanding cylindrical wall 86 of the upper member 54; the gasket 46; and the undersurface of the upper surface 34 of the casing 12. Located within the water tight cavity or housing 96 and secured to the opposite end of the shaft 92 for rotation therewith is a first magnetic member 98 which constitutes one portion of the aforementioned magnetic coupling means broadly designated 24.

Figure 3:
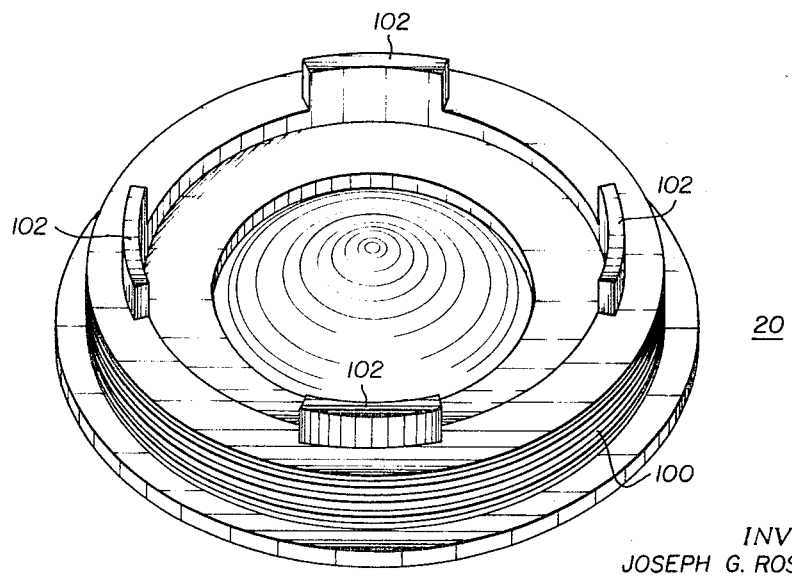
FIG. 3 is a perspective view of the screw-in bottom plate of FIG. 1.

As best seen in FIG. 3, the removable bottom plate 20 is of one-piece polymer or metal construction and includes the externally threaded cylindrical wall surface 100 which is threadably received by the internal opening 36 at the bottom of the casing 12 (see FIG. 1). Additionally, the bottom plate includes a plurality of spaced apart upstanding projections 102 which as best shown in FIG. 1 are coaxially aligned with the upstanding cylindrical wall 52 of the lower member 48 of the measuring chamber 14.

In assembling the meter 10 of FIG. 1, the entire measuring chamber 14 with the driven element 16, the motion transmitting means 18, and the magnetic member 98 is preassembled and is inserted into the casing 12 through the bottom opening 36 thereof. It will be appreciated that because of the vertical flow path through the measuring chamber 14 (established by the openings 60 and 62 of FIG. 2), there is no preferred rotative or angular orientation of the chamber 14 within the casing. The chamber 14 is simply seated such that the recessed shoulder 88 of the upper member 54 thereof fits through the circularly apertured retaining surface 42 whereby the extremity of the upper cylindrical wall 86 of the member 54 will be urged against the sealing gasket 46.

Next, the bottom plate 20 is screwed into the opening 36 in the casing 12 such that the upstanding projections 102 apply compressive forces along the upstanding cylindrical wall 52 of the lower member 48 of the measuring chamber 14. Such compressive forces will urge the upper surface of the upper member 54 of the chamber 14 into firm sealing engagement with the undersurface of the retaining surface 42 to establish the necessary isolation between the input and output sides of the measuring chamber 14. It should be noted that the compressive forces generated by the screw-in bottom plate 20 are applied only along the vertical side wall 52 of the lower member 48 of the measuring chamber 14, and not at any unsupported central portion thereof. Thus, the possibility of locking the driven element 16 within the chamber 14 is avoided.

Removably supported on the upper surface 34 of the casing 12 is the register 22. The register includes a partly frustoconical; partly cylindrical body member 104 (preferably of plastic material) which includes outstanding apertured embossments or lugs (not seen in FIG. 1) by which the register 22 may be removably secured to the upper casing surface 34. The register 22 also includes an upper member 106 which is provided with an elongated aperture 108 through which the numerals of counter wheels 110 of a counter broadly designated 112 are viewable. Since registers and counters per se do not form part of the instant invention, further description thereof is unnecessary. For the purpose of understanding the instant invention, it is sufficient to note that the register 22 includes internal gearing mechanism broadly designated 114 for advancing the counter wheels 110 in a well known manner in response to the rotation of an input driving shaft 116.

Secured to the input driving shaft 116 and rotatable therewith is a second magnet 118 of the aforementioned magnetic coupling means 24. When the register 22 is secured to the upper surface 34 of the casing 12, the second magnet 118 will be in magnetic proximity to the first magnet 98 of the magnetic coupling means 24 and will be magnetically coupled thereto for rotation therewith. It will be appreciated that the magnetic coupling means 24 eliminates the necessity for any mechanical interconnection between the internal mechanism of the register 22 and the internal mechanism of the casing 12. In accordance with the invention, the simple placement of the register 22 on the upper surface 34 of the casing 12 is all that is necessary to operatively interconnect these two mechanically isolated portions of the meter 10.

In operation, water flows into the casing 12 through the entry port 26 thereof. The water passes through a filtering barrier 120 seated in the casing 12; through the spaces disposed between the upstanding projections 102 of the screw-in bottom plate 20 (FIG. 3); up into the measuring chamber 14 through the entry opening 60 thereof (FIG. 2); drives the driven element or piston 16 in the aforedescribed oscillatory motion; exits from the measuring chamber 14 through the exit opening 62 thereof (FIG. 2); and leaves the casing 12 through the exit port 28 thereof. The above described flow path is schematically represented by directional arrows 122 in FIG. 1.

As the water flows through the measuring chamber 14, it causes the driven element 16 to experience oscillatory motion representative of the extent of water flow. As mentioned previously, the rotation of the upper projecting portion 74 of the intermediate surface 72 of the driven element 16 will describe circular motion, which in turn imparts rotary motion to the driver arm 94 of the motion transmitting means 18. Through the shaft 92, the first magnet member 98 of the magnetic coupling means 24 is rotated which, through the magnetic coupling, causes the rotation of the second magnetic member 118 thereof. Accordingly, the input driving shaft 116 of the gearing mechanism 114 of the register 22 is rotated and thereby brings about the incremental advancement of the counter wheels 110 to provide a visual indication of the water flow through the meter 10.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

We claim:
1. A fluid meter comprising:
a casing having first and second ports for fluid flow therethrough;
a measuring chamber located within said casing; said measuring chamber having an upper and lower surface, said upper surface having an opening communicating with said first port, said lower surface having an opening communicating with said second port;
driven means located in said measuring chamber and responsive to the flow of fluid therethrough for producing a predetermined repetitive motion thereof representative of said fluid flow;
motion transmitting means responsive to the motion of said driven means for transmitting the motion of said driven means to a location outside of said measuring chamber, and within said casing;
register means positioned outside of said casing for providing an indication of fluid flow;
magnetic coupling means responsive to the motion of said motion transmitting means for driving said register means, said magnetic coupling means comprising first and second magnetic members, said first magnetic member responsive to the movement of said motion transmitting means;
said second magnetic member being operatively connected to said register means to advance said register means upon rotation of said second magnetic member, said first and second magnetic member being disposed in magnetically operable relationship on opposite sides of the upper surface of said casing;
further including removable cover means for retaining said measuring chamber in a predetermined position within said casing and for selectively closing said bottom opening;
wherein said removable cover means is threadably received by said casing.
2. The fluid meter of claim 1 and further including filter means selectively blocking said second port.
3. The fluid meter of claim 1 wherein the flow of fluid through said first and second ports is generally transverse to the flow of fluid through said upper and lower surfaces of said measuring chamber.
4. The fluid meter of claim 1 wherein said lower surface of said measuring chamber includes sediment collection means.
5. The fluid meter of claim 4 wherein said sediment collection means comprises an annular groove disposed in said lower surface.
6. The fluid meter of claim 1 wherein said first member includes a depending skirt within which the upper extremity of said second member is frictionally received.

7. The fluid meter of claim 6 wherein said driven member comprises an oscillating piston.

8. The fluid meter of claim 7 wherein said first and second members of said measuring chambers are of a polymer material and said piston is a elastomer having a specific gravity approximately the same as the fluid flowing through said meter.

* * * * *